US008515114B2

(12) United States Patent
Solum

(10) Patent No.: US 8,515,114 B2
(45) Date of Patent: Aug. 20, 2013

(54) WIRELESS SYSTEM FOR HEARING COMMUNICATION DEVICES PROVIDING WIRELESS STEREO RECEPTION MODES

(75) Inventor: Jeffrey Paul Solum, Deephaven, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 13/270,860

(22) Filed: Oct. 11, 2011

(65) Prior Publication Data

US 2012/0121094 A1 May 17, 2012

Related U.S. Application Data

(63) Continuation of application No. 11/619,541, filed on Jan. 3, 2007, now Pat. No. 8,041,066.

(51) Int. Cl.
*H04M 1/00* (2006.01)
*H04M 9/00* (2006.01)
*H04R 25/00* (2006.01)
*H04B 7/00* (2006.01)

(52) U.S. Cl.
USPC ........... 381/370; 381/312; 379/430; 455/41.2

(58) Field of Classification Search
USPC ................. 381/370–384, 312, 315; 379/430; 455/41.2, 41.3, 585.2, 575.2
See application file for complete search history.

(56) References Cited

U.S. PATENT DOCUMENTS

| | | | |
|---|---|---|---|
| 2,530,621 | A | 11/1950 | Lybarger |
| 2,554,834 | A | 5/1951 | Lavery |
| 2,656,421 | A | 10/1953 | Lybarger |
| 3,396,245 | A | 8/1968 | Flygstad |
| 3,527,901 | A | 9/1970 | Geib |
| 3,571,514 | A | 3/1971 | Wruk |
| 3,660,695 | A | 5/1972 | Schmitt |
| 3,742,359 | A | 6/1973 | Behymer |
| 3,770,911 | A | 11/1973 | Knowles et al. |
| 3,798,390 | A | 3/1974 | Gage et al. |
| 3,836,732 | A | 9/1974 | Johanson et al. |
| 3,875,349 | A | 4/1975 | Ruegg |
| 3,894,196 | A | 7/1975 | Briskey |
| 3,946,168 | A | 3/1976 | Preves |
| 3,975,599 | A | 8/1976 | Johanson |

(Continued)

FOREIGN PATENT DOCUMENTS

| | | |
|---|---|---|
| CH | 670349 | 5/1989 |
| CH | 673551 | 3/1990 |

(Continued)

OTHER PUBLICATIONS

"U.S. Appl. No. 09/052,631, Final Office Action mailed Jul. 11, 2000", 8 pgs.

(Continued)

*Primary Examiner* — Tuan D Nguyen

(74) *Attorney, Agent, or Firm* — Schwegman Lundberg & Woessner, P.A.

(57) ABSTRACT

The present subject matter relates to the wireless stereo reception of first and second audio information by wireless hearing communication devices. One type of device which may employ the present subject matter is a hearing assistance device, such as a hearing aid. Various forms and protocols of signal transmission are employed in varying embodiments. The present subject matter includes various communication modes such as eavesdropping modes and relaying modes.

21 Claims, 3 Drawing Sheets

(56) References Cited

U.S. PATENT DOCUMENTS

| | | | |
|---|---|---|---|
| 4,051,330 | A | 9/1977 | Cole |
| 4,142,072 | A | 2/1979 | Berland |
| 4,187,413 | A | 2/1980 | Moser |
| 4,366,349 | A | 12/1982 | Adelman |
| 4,395,601 | A | 7/1983 | Kopke et al. |
| 4,396,806 | A | 8/1983 | Anderson |
| 4,419,544 | A | 12/1983 | Adelman |
| 4,425,481 | A | 1/1984 | Mansgold et al. |
| 4,449,018 | A | 5/1984 | Stanton |
| 4,456,795 | A | 6/1984 | Saito |
| 4,467,145 | A | 8/1984 | Borstel |
| 4,471,490 | A | 9/1984 | Bellafiore |
| 4,489,330 | A | 12/1984 | Marutake et al. |
| 4,490,585 | A | 12/1984 | Tanaka |
| 4,508,940 | A | 4/1985 | Steeger |
| 4,596,899 | A | 6/1986 | Wojcik et al. |
| 4,622,440 | A | 11/1986 | Slavin |
| 4,631,419 | A | 12/1986 | Sadamatsu et al. |
| 4,637,402 | A | 1/1987 | Adelman |
| 4,638,125 | A | 1/1987 | Buettner |
| 4,696,032 | A | 9/1987 | Levy |
| 4,710,961 | A | 12/1987 | Buttner |
| 4,712,244 | A | 12/1987 | Zwicker et al. |
| 4,723,293 | A | 2/1988 | Harless |
| 4,751,738 | A | 6/1988 | Widrow et al. |
| 4,756,312 | A | 7/1988 | Epley |
| 4,764,957 | A | 8/1988 | Angelini et al. |
| 4,845,755 | A | 7/1989 | Busch et al. |
| 4,862,509 | A | 8/1989 | Towsend |
| 4,882,762 | A | 11/1989 | Waldhauer |
| 4,887,299 | A | 12/1989 | Cummins et al. |
| 4,926,464 | A | 5/1990 | Schley-May |
| 4,930,156 | A | 5/1990 | Norris |
| 4,995,085 | A | 2/1991 | Kern et al. |
| 5,010,575 | A | 4/1991 | Marutake et al. |
| 5,027,410 | A | 6/1991 | Williamson et al. |
| 5,029,215 | A | 7/1991 | Miller, II |
| 5,086,464 | A | 2/1992 | Groppe |
| 5,091,952 | A | 2/1992 | Williamson et al. |
| 5,157,405 | A | 10/1992 | Wycoff et al. |
| 5,189,704 | A | 2/1993 | Krauss |
| 5,204,917 | A | 4/1993 | Arndt et al. |
| 5,212,827 | A | 5/1993 | Meszko et al. |
| 5,214,709 | A | 5/1993 | Ribic |
| 5,226,087 | A | 7/1993 | Ono et al. |
| 5,280,524 | A | 1/1994 | Norris |
| 5,289,544 | A | 2/1994 | Franklin |
| 5,390,254 | A | 2/1995 | Adelman |
| 5,404,407 | A | 4/1995 | Weiss |
| 5,422,628 | A | 6/1995 | Rodgers |
| 5,425,104 | A | 6/1995 | Shennib |
| 5,426,689 | A | 6/1995 | Griffith et al. |
| 5,434,924 | A | 7/1995 | Jampolsky |
| 5,463,692 | A | 10/1995 | Fackler |
| 5,479,522 | A | 12/1995 | Lindemann et al. |
| 5,483,599 | A | 1/1996 | Zagorski |
| 5,502,769 | A | 3/1996 | Gilbertson |
| 5,524,056 | A | 6/1996 | Killion et al. |
| 5,553,152 | A | 9/1996 | Newton |
| 5,581,747 | A | 12/1996 | Anderson |
| 5,600,728 | A | 2/1997 | Satre |
| 5,629,985 | A | 5/1997 | Thompson |
| 5,636,285 | A | 6/1997 | Sauer |
| 5,640,293 | A | 6/1997 | Dawes et al. |
| 5,640,457 | A | 6/1997 | Gnecco et al. |
| 5,651,071 | A | 7/1997 | Lindemann et al. |
| 5,659,621 | A | 8/1997 | Newton |
| 5,687,242 | A | 11/1997 | Iburg |
| 5,706,351 | A | 1/1998 | Weinfurtner |
| 5,710,820 | A | 1/1998 | Martin et al. |
| 5,721,783 | A | 2/1998 | Anderson |
| 5,734,976 | A | 3/1998 | Bartschi et al. |
| 5,737,430 | A | 4/1998 | Widrow |
| 5,740,257 | A | 4/1998 | Marcus |
| 5,751,820 | A | 5/1998 | Taenzer |
| 5,757,932 | A | 5/1998 | Lindemann et al. |
| 5,757,933 | A | 5/1998 | Preves et al. |
| 5,761,319 | A | 6/1998 | Dar et al. |
| 5,768,397 | A | 6/1998 | Fazio |
| 5,793,875 | A | 8/1998 | Lehr et al. |
| 5,796,848 | A | 8/1998 | Martin |
| 5,809,151 | A | 9/1998 | Husung |
| 5,822,442 | A | 10/1998 | Agnew et al. |
| 5,823,610 | A | 10/1998 | Ryan et al. |
| 5,825,631 | A | 10/1998 | Prchal |
| 5,835,610 | A | 11/1998 | Ishige et al. |
| 5,835,611 | A | 11/1998 | Kaiser et al. |
| 5,852,668 | A | 12/1998 | Ishige et al. |
| 5,862,238 | A | 1/1999 | Agnew et al. |
| 5,966,639 | A | 10/1999 | Goldberg et al. |
| 5,991,419 | A | 11/1999 | Brander |
| 5,991,420 | A | 11/1999 | Stern |
| 6,031,922 | A | 2/2000 | Tibbetts |
| 6,031,923 | A | 2/2000 | Gnecco et al. |
| 6,041,129 | A | 3/2000 | Adelman |
| 6,078,675 | A | 6/2000 | Bowen-Nielsen et al. |
| 6,078,825 | A | 6/2000 | Hahn et al. |
| 6,088,339 | A | 7/2000 | Meyer |
| 6,101,258 | A | 8/2000 | Killion et al. |
| 6,104,821 | A | 8/2000 | Husung |
| 6,115,478 | A | 9/2000 | Schneider |
| 6,118,877 | A | 9/2000 | Lindemann et al. |
| 6,144,748 | A | 11/2000 | Kerns |
| 6,148,087 | A | 11/2000 | Martin |
| 6,157,727 | A | 12/2000 | Rueda |
| 6,157,728 | A | 12/2000 | Tong et al. |
| 6,175,633 | B1 | 1/2001 | Morrill et al. |
| 6,216,040 | B1 | 4/2001 | Harrison |
| 6,230,029 | B1 | 5/2001 | Hahn et al. |
| 6,236,731 | B1 | 5/2001 | Brennan et al. |
| 6,240,192 | B1 | 5/2001 | Brennan et al. |
| 6,240,194 | B1 | 5/2001 | De Koning |
| 6,310,556 | B1 | 10/2001 | Green et al. |
| 6,311,155 | B1 | 10/2001 | Vaudrey et al. |
| 6,324,291 | B1 | 11/2001 | Weidner |
| 6,327,370 | B1 | 12/2001 | Killion et al. |
| 6,347,148 | B1 | 2/2002 | Brennan et al. |
| 6,356,741 | B1 | 3/2002 | Bilotti et al. |
| 6,366,863 | B1 | 4/2002 | Bye et al. |
| 6,381,308 | B1 | 4/2002 | Cargo et al. |
| 6,389,142 | B1 | 5/2002 | Hagen et al. |
| 6,449,662 | B1 | 9/2002 | Armitage |
| 6,459,882 | B1 | 10/2002 | Palermo et al. |
| 6,466,679 | B1 | 10/2002 | Husung |
| 6,522,764 | B1 | 2/2003 | Bogeskov-Jensen |
| 6,549,633 | B1 | 4/2003 | Westermann |
| 6,633,645 | B2 | 10/2003 | Bren et al. |
| 6,694,034 | B2 | 2/2004 | Julstrom et al. |
| 6,760,457 | B1 | 7/2004 | Bren et al. |
| 7,016,511 | B1 | 3/2006 | Shennib |
| 7,062,223 | B2 | 6/2006 | Gerber et al. |
| 7,075,903 | B1 | 7/2006 | Solum |
| 7,099,486 | B2 | 8/2006 | Julstrom et al. |
| 7,103,191 | B1 | 9/2006 | Killion |
| 7,116,792 | B1 | 10/2006 | Taenzer et al. |
| 7,139,404 | B2 | 11/2006 | Feeley et al. |
| 7,142,814 | B2 | 11/2006 | Nassimi |
| 7,149,552 | B2 | 12/2006 | Lair |
| 7,162,381 | B2 | 1/2007 | Boor et al. |
| 7,181,032 | B2 | 2/2007 | Jakob et al. |
| 7,248,713 | B2 | 7/2007 | Bren et al. |
| 7,257,372 | B2 | 8/2007 | Kaltenbach et al. |
| 7,317,997 | B2 | 1/2008 | Boor et al. |
| 7,369,669 | B2 | 5/2008 | Hagen et al. |
| 7,412,294 | B1 | 8/2008 | Woolfork |
| 7,447,325 | B2 | 11/2008 | Bren et al. |
| 7,450,078 | B2 | 11/2008 | Knudsen et al. |
| 7,529,565 | B2 | 5/2009 | Hilpisch et al. |
| 7,561,707 | B2 | 7/2009 | Kornagel |
| 7,590,253 | B2 | 9/2009 | Killion |
| 7,813,762 | B2 | 10/2010 | Sanguino et al. |
| 7,822,217 | B2 | 10/2010 | Hagen et al. |
| 8,041,066 | B2 | 10/2011 | Solum |
| 8,208,642 | B2 | 6/2012 | Edwards |

| | | | |
|---|---|---|---|
| 2001/0007050 | A1 | 7/2001 | Adelman |
| 2001/0007335 | A1 | 7/2001 | Tuttle et al. |
| 2002/0006206 | A1 | 1/2002 | Scofield |
| 2002/0030871 | A1 | 3/2002 | Anderson et al. |
| 2002/0076073 | A1 | 6/2002 | Taenzer et al. |
| 2002/0090099 | A1 | 7/2002 | Hwang |
| 2002/0131614 | A1 | 9/2002 | Jakob et al. |
| 2002/0132585 | A1 | 9/2002 | Palermo et al. |
| 2002/0186857 | A1 | 12/2002 | Bren et al. |
| 2003/0045283 | A1 | 3/2003 | Hagedoorn |
| 2003/0059073 | A1 | 3/2003 | Bren et al. |
| 2003/0059076 | A1 | 3/2003 | Martin |
| 2003/0078071 | A1 | 4/2003 | Uchiyama |
| 2003/0133582 | A1 | 7/2003 | Niederdrank |
| 2003/0215106 | A1 | 11/2003 | Hagen et al. |
| 2003/0231783 | A1 | 12/2003 | Kah |
| 2004/0010181 | A1 | 1/2004 | Feeley et al. |
| 2004/0052391 | A1 | 3/2004 | Bren et al. |
| 2004/0052392 | A1 | 3/2004 | Sacha et al. |
| 2004/0077387 | A1 | 4/2004 | Sayag et al. |
| 2004/0136555 | A1 | 7/2004 | Enzmann |
| 2004/0141628 | A1 | 7/2004 | Villaverde et al. |
| 2004/0190739 | A1 | 9/2004 | Bachler et al. |
| 2004/0208333 | A1 | 10/2004 | Cheung et al. |
| 2005/0008178 | A1 | 1/2005 | Joergensen et al. |
| 2005/0078844 | A1 | 4/2005 | Von Ilberg |
| 2005/0099341 | A1 | 5/2005 | Zhang et al. |
| 2005/0100182 | A1 | 5/2005 | Sykes et al. |
| 2005/0160270 | A1 | 7/2005 | Goldberg et al. |
| 2005/0249371 | A1 | 11/2005 | Vogt |
| 2006/0013420 | A1 | 1/2006 | Sacha |
| 2006/0018497 | A1 | 1/2006 | Kornagel |
| 2006/0039577 | A1 | 2/2006 | Sanguino et al. |
| 2006/0044140 | A1 | 3/2006 | Berg |
| 2006/0057973 | A1 | 3/2006 | Wikel et al. |
| 2006/0068842 | A1 | 3/2006 | Sanguino et al. |
| 2006/0093172 | A1 | 5/2006 | Ludvigsen et al. |
| 2006/0193273 | A1 | 8/2006 | Passier et al. |
| 2006/0193375 | A1 | 8/2006 | Lee |
| 2006/0198529 | A1 | 9/2006 | Kjems et al. |
| 2006/0205349 | A1 | 9/2006 | Passier et al. |
| 2006/0245611 | A1 | 11/2006 | Jorgensen et al. |
| 2006/0274747 | A1 | 12/2006 | Duchscher et al. |
| 2007/0004464 | A1 | 1/2007 | Lair et al. |
| 2007/0066297 | A1 | 3/2007 | Heidari-bateni |
| 2007/0080889 | A1 | 4/2007 | Zhang |
| 2007/0121975 | A1 | 5/2007 | Sacha et al. |
| 2007/0149261 | A1 | 6/2007 | Huddart |
| 2007/0230727 | A1 | 10/2007 | Sanguino et al. |
| 2007/0248237 | A1 | 10/2007 | Bren et al. |
| 2008/0008341 | A1 | 1/2008 | Edwards |
| 2008/0013769 | A1 | 1/2008 | Sacha et al. |
| 2008/0159548 | A1 | 7/2008 | Solum |
| 2008/0232623 | A1 | 9/2008 | Solum et al. |
| 2008/0273727 | A1 | 11/2008 | Hagen et al. |
| 2008/0306745 | A1 | 12/2008 | Roy et al. |
| 2010/0148931 | A1 | 6/2010 | Pappu et al. |
| 2011/0090837 | A1 | 4/2011 | Duchscher et al. |
| 2011/0158442 | A1 | 6/2011 | Woods |
| 2012/0177235 | A1 | 7/2012 | Solum |
| 2012/0308019 | A1 | 12/2012 | Edwards |

FOREIGN PATENT DOCUMENTS

| | | | |
|---|---|---|---|
| DE | 2510731 | A1 | 9/1976 |
| DE | 3036417 | A1 | 5/1982 |
| DE | 3443907 | A1 | 6/1985 |
| DE | 10146886 | A1 | 4/2003 |
| EP | 0789474 | A2 | 8/1997 |
| EP | 0941014 | A2 | 9/1999 |
| EP | 0989775 | A1 | 3/2000 |
| EP | 1185138 | A2 | 3/2002 |
| EP | 1196008 | A2 | 4/2002 |
| EP | 1398995 | A2 | 3/2004 |
| EP | 1174003 | B1 | 7/2004 |
| EP | 1484942 | A2 | 12/2004 |
| EP | 1519625 | A2 | 3/2005 |
| EP | 1531650 | A2 | 5/2005 |
| EP | 1670283 | A1 | 6/2006 |
| EP | 1715718 | A2 | 10/2006 |
| EP | 1365628 | B1 | 12/2011 |
| FR | 2714561 | A1 | 6/1995 |
| JP | 918998 | A | 1/1997 |
| JP | 10084209 | | 3/1998 |
| WO | WO-9641498 | A1 | 12/1996 |
| WO | WO-0021332 | A2 | 4/2000 |
| WO | WO-0158064 | A1 | 8/2001 |
| WO | WO-0167433 | A1 | 9/2001 |
| WO | WO-0203750 | A2 | 1/2002 |
| WO | WO-0209363 | A2 | 1/2002 |
| WO | WO-0223950 | A2 | 3/2002 |
| WO | WO-2004034738 | A1 | 4/2004 |
| WO | WO-2004100607 | A1 | 11/2004 |
| WO | WO-2004110099 | A2 | 12/2004 |
| WO | WO-2005009072 | A2 | 1/2005 |
| WO | WO-2005101731 | A2 | 10/2005 |
| WO | WO-2006023857 | A1 | 3/2006 |
| WO | WO-2006023920 | A1 | 3/2006 |
| WO | WO-2006078586 | A2 | 7/2006 |
| WO | WO-2006133158 | A1 | 12/2006 |
| WO | WO-2007068243 | A1 | 6/2007 |
| WO | WO-2009063097 | A2 | 5/2009 |

OTHER PUBLICATIONS

"U.S. Appl. No. 09/052,631, Final Office Action mailed Jul. 30, 2001", 5 pgs.

"U.S. Appl. No. 09/052,631, Non Final Office Action mailed Jan. 18, 2001", 6 pgs.

"U.S. Appl. No. 09/052,631, Non Final Office Action mailed Dec. 28, 1999", 10 pgs.

"U.S. Appl. No. 09/052,631, Notice of Allowance mailed Dec. 18, 2001", 6 pgs.

"U.S. Appl. No. 09/052,631, Response filed May 18, 2001 to Non Final Office Action mailed Jan. 18, 2001", 7 pgs.

"U.S. Appl. No. 09/052,631, Response filed Oct. 30, 2001 to Final Office Action mailed Jul. 30, 2001", 5 pgs.

"U.S. Appl. No. 09/052,631, Response filed Nov. 10, 2000 to Final Office Action mailed Jul. 11, 2000", 5 pgs.

"U.S. Appl. No. 09/659,214, Advisory Action mailed Jun. 2, 2003", 3 pgs.

"U.S. Appl. No. 09/659,214, Final Office Action mailed Feb. 14, 2003", 7 pgs.

"U.S. Appl. No. 09/659,214, Final Office Action mailed Mar. 19, 2003", 7 pgs.

"U.S. Appl. No. 09/659,214, Non Final Office Action mailed Jul. 18, 2003", 7 pgs.

"U.S. Appl. No. 09/659,214, Non Final Office Action mailed Sep. 6, 2002", 7 pgs.

"U.S. Appl. No. 09/659,214, Notice of Allowance mailed Feb. 10, 2004", 6 pgs.

"U.S. Appl. No. 09/659,214, Response filed May 19, 2003 to Final Office Action mailed Mar. 19, 2003", 9 pgs.

"U.S. Appl. No. 09/659,214, Response filed Oct. 24, 2003 to Non Final Office Action mailed Jul. 18, 2003", 9 pgs.

"U.S. Appl. No. 09/659,214, Response filed Nov. 12, 2002 to Non Final Office Action mailed Sep. 6, 2002", 10 pgs.

"U.S. Appl. No. 10/146,536, Advisory Action mailed Oct. 16, 2007", 5 pgs.

"U.S. Appl. No. 10/146,536, Final Office Action mailed May 18, 2007", 28 pgs.

"U.S. Appl. No. 10/146,536, Non-Final Office Action mailed Sep. 19, 2006", 26 pgs.

"U.S. Appl. No. 10/146,536, Non-Final Office Action mailed Dec. 16, 2005", 25 pgs.

"U.S. Appl. No. 10/146,536, Notice of Allowance mailed Dec. 27, 2007", 10 pgs.

"U.S. Appl. No. 10/146,536, Response filed Feb. 20, 2007 to Non-Final Office Action mailed Sep. 19, 2006", 20 pgs.

"U.S. Appl. No. 10/146,536, Response filed Jun. 16, 2006 to Non-Final Office Action mailed Dec. 16, 2005", 14 pgs.

"U.S. Appl. No. 10/146,536, Response filed Nov. 19, 2007 to Final Office Action mailed May 18, 2007", 19 pgs.

"U.S. Appl. No. 10/146,536, Response filed Sep. 18, 2007 to Final Office Action dated Jun. 18, 2007", 24 pgs.

"U.S. Appl. No. 10/214,045, 312 Amendment filed Jun. 12, 2003", 6 pgs.
"U.S. Appl. No. 10/214,045, Non Final Office Action mailed Dec. 2, 2002", 7 pgs.
"U.S. Appl. No. 10/214,045, Notice of Allowance mailed Apr. 8, 2003", 17 pgs.
"U.S. Appl. No. 10/214,045, Response filed Apr. 2, 2002 to Non Final Office Action mailed Dec. 2, 2002", 8 pgs.
"U.S. Appl. No. 10/243,412, Examiner Interview Summary mailed Mar. 9, 2006", 7 pgs.
"U.S. Appl. No. 10/243,412, Final Office Action mailed Jan. 9, 2008", 6 pgs.
"U.S. Appl. No. 10/243,412, Non Final Office Action mailed May 17, 2007", 10 pgs.
"U.S. Appl. No. 10/243,412, Non Final Office Action mailed Jul. 28, 2006", 10 pgs.
"U.S. Appl. No. 10/243,412, Notice of Allowance mailed Jun. 30, 2008", 8 pgs.
"U.S. Appl. No. 10/243,412, Response filed Jan. 16, 2006 to Restriction Requirement mailed Dec. 16, 2005", 12 pgs.
"U.S. Appl. No. 10/243,412, Response filed May 9, 2008 to Non-Final Office Action mailed Jan. 9, 2008", 12 pgs.
"U.S. Appl. No. 10/243,412, Response filed Sep. 17, 2007 to Non Final Office Action mailed May 17, 2007", 15 pgs.
"U.S. Appl. No. 10/243,412, Response filed Dec. 28, 2006 to Non Final Office Action mailed Jul. 28, 2006", 16 pgs.
"U.S. Appl. No. 10/243,412, Restriction Requirement mailed Dec. 16, 2005", 5 pgs.
"U.S. Appl. No. 10/244,295, Final Office Action mailed Aug. 11, 2006", 9 pgs.
"U.S. Appl. No. 10/244,295, Final Office Action mailed May 24, 2007", 11 pgs.
"U.S. Appl. No. 10/244,295, Non Final Office Action mailed Mar. 11, 2005", 10 pgs.
"U.S. Appl. No. 10/244,295, Non Final Office Action mailed Nov. 29, 2006", 12 pgs.
"U.S. Appl. No. 10/244,295, Non Final Office Action mailed Feb. 3, 2006", 9 pgs.
"U.S. Appl. No. 10/244,295, Notice of Allowance mailed Aug. 7, 2007", 7 pgs.
"U.S. Appl. No. 10/244,295, Response filed Feb. 28, 2007 to Non Final Office Action mailed Nov. 29, 2006", 16 pgs.
"U.S. Appl. No. 10/244,295, Response filed May 3, 2020 to Non-Final Office Action mailed Feb. 3, 2006", 17 pgs.
"U.S. Appl. No. 10/244,295, Response filed Jun. 13, 2005 to Non-Final Office Action mailed Mar. 11, 2005", 20 pgs.
"U.S. Appl. No. 10/244,295, Response filed Jul. 24, 2007 to Final Office Action mailed May 24, 2007", 12 pgs.
"U.S. Appl. No. 10/244,295, Response filed Oct. 11, 2006 Final Office Action mailed Aug. 11, 2006", 17 pgs.
"U.S. Appl. No. 10/284,877, Final Office Action mailed Jun. 14, 2006", 11 pgs.
"U.S. Appl. No. 10/284,877, Final Office Action mailed Nov. 14, 2006", 11 pgs.
"U.S. Appl. No. 10/284,877, Non Final Office Action mailed Mar. 25, 2005", 8 pgs.
"U.S. Appl. No. 10/284,877, Non Final Office Action mailed Dec. 1, 2005", 10 pgs.
"U.S. Appl. No. 10/284,877, Notice of Allowance mailed Mar. 22, 2007", 7 pgs.
"U.S. Appl. No. 10/284,877, Response filed Mar. 1, 2006 to Non Final Office Action mailed Dec. 1, 2005", 17 pgs.
"U.S. Appl. No. 10/284,877, Response filed Mar. 14, 2007 to Final Office Action mailed Nov. 14, 2007", 8 pgs.
"U.S. Appl. No. 10/284,877, Response filed Jun. 27, 2005 to Non Final Office Action mailed Mar. 25, 2005", 15 pgs.
"U.S. Appl. No. 10/284,877, Response filed Oct. 16, 2006 to Final Office Action mailed Jun. 14, 2006", 16 pgs.
"U.S. Appl. No. 11/207,555, Final Office Action mailed Jan. 22, 2009", 15 pgs.
"U.S. Appl. No. 11/207,555, Final Office Action mailed Feb. 4, 2010", 13 pgs.
"U.S. Appl. No. 11/207,555, Non-Final Office Action mailed Jun. 3, 2008", 12 pgs.
"U.S. Appl. No. 11/207,555, Non-Final Office Action mailed Jul. 16, 2009", 12 pgs.
"U.S. Appl. No. 11/207,555, Response filed Jun. 22, 2009 to Final Office Action mailed Jan. 22, 2009", 9 pgs.
"U.S. Appl. No. 11/207,555, Response filed Nov. 3, 2008 to Non Final Office Action mailed Jun. 3, 2008", 8 pgs.
"U.S. Appl. No. 11/207,555, Response filed Nov. 16, 2009 to Non-Final Office Action mailed Jul. 15, 2009", 8 pgs.
"U.S. Appl. No. 11/207,591, Final Office Action mailed Jan. 6, 2009", 13 pgs.
"U.S. Appl. No. 11/207,591, Final Office Action mailed Jan. 15, 2010", 13 pgs.
"U.S. Appl. No. 11/207,591, Non-Final Office Action mailed Jul. 14, 2009", 13 pgs.
"U.S. Appl. No. 11/207,591, Non-Final Office Action mailed Jul. 28, 2008", 11 pgs.
"U.S. Appl. No. 11/207,591, Non-Final Office Action mailed Nov. 16, 2007", 9 pgs.
"U.S. Appl. No. 11/207,591, Response filed May 6, 2008 to Non Final Office Action mailed Nov. 16, 2007", 8 pgs.
"U.S. Appl. No. 11/207,591, Response filed May 6, 2009 to Final Office Action mailed Jan. 6, 2009", 8 pgs.
"U.S. Appl. No. 11/207,591, Response filed Oct. 14, 2009 to Non Final Office Action mailed Jul. 14, 2009", 10 pgs.
"U.S. Appl. No. 11/207,591, Response filed Oct. 28, 2008 to Non Final Office Action mailed Jul. 28, 2008", 7 pgs.
"U.S. Appl. No. 11/207,591, Notice of Allowance mailed Jul. 1, 2010", 7 Pgs.
"U.S. Appl. No. 11/207,591, Response filed Jun. 15, 2010 to Final Office Action mailed Jan. 15, 2010", 9 pgs.
"U.S. Appl. No. 11/447,617, Final Office Action mailed Mar. 3, 2010", 31 Pgs.
"U.S. Appl. No. 11/447,617, Non Final Office Action Mailed Aug. 31, 2011", 29 pgs.
"U.S. Appl. No. 11/447,617, Non-Final Office Action mailed Jun. 22, 2009", 25 Pgs.
"U.S. Appl. No. 11/447,617, Response filed Aug. 3, 2010 to Final Office Action mailed Mar. 3, 2010", 14 Pgs.
"U.S. Appl. No. 11/447,617, Response filed Nov. 23, 2009 to Non Final Office Action mailed Jun. 22, 2009", 15 pgs.
"U.S. Appl. No. 11/447,617, Response filed May 26, 2009 to Restriction Requirement mailed Apr. 24, 2009", 8 pgs.
"U.S. Appl. No. 11/447,617, Restriction Requirement mailed", 6 pgs.
"U.S. Appl. No. 11/456,538, Final Office Action mailed Mar. 3, 2011", 28 pgs.
"U.S. Appl. No. 11/456,538, Non-Final Office Action mailed Aug. 19, 2010", 25 Pgs.
"U.S. Appl. No. 11/456,538, Notice of Allowance mailed Apr. 5, 2012", 10 pgs.
"U.S. Appl. No. 11/456,538, Notice of Allowance mailed May 16, 2012", 10 pgs.
"U.S. Appl. No. 11/456,538, Notice of Allowance Mailed Dec. 19, 2011", 9 pgs.
"U.S. Appl. No. 11/456,538, Response filed Jan. 19, 2011 to Non Final Office Action mailed Aug. 19, 2010", 16 pgs.
"U.S. Appl. No. 11/456,538, Response filed Aug. 5, 2011 to Final Office Action mailed Mar. 3, 2011", 15 pgs.
"U.S. Appl. No. 11/619,541, Non Final Office Action mailed Dec. 21, 2010", 7 pgs.
"U.S. Appl. No. 11/619,541, Notice of Allowance mailed Jul. 5, 2011", 6 pgs.
"U.S. Appl. No. 11/619,541, Response filed May 23, 2011 to Non Final Office Action mailed Dec. 21, 2010", 10 pgs.
"U.S. Appl. No. 11/692,763, Non-Final Office Action mailed Jan. 21, 2010", 11 pgs.
"U.S. Appl. No. 11/692,763, Response filed Jun. 21, 2010 to Non Final Office Action mailed Jan. 21, 2010", 9 pgs.
"U.S. Appl. No. 12/115,423, Notice of Allowance mailed Sep. 15, 2010", 9 pgs.
"U.S. Appl. No. 12/649,648, Non Final Office Action mailed Mar. 5, 2013", 15 pgs.

"U.S. Appl. No. 12/980,696, Non Final Office Action mailed", 7 pgs.
"Canadian Application Serial No. 2,428,908, Office action mailed Mar. 15, 2007", 6 pgs.
"Canadian Application Serial No. 2,428,908, Office action mailed Nov. 4, 2008", 9 pgs.
"Canadian Application Serial No. 2,428,908, Response filed Sep. 17, 2007 to Office Action mailed Mar. 15, 2007", 25 pgs.
"Chinese Application Serial No. 200680028085.8, Office Action mailed Apr. 12, 2011", 3 pgs.
"European Application Serial No. 05791651.2, Office Action mailed Mar. 15, 2011", 5 pgs.
"European Application Serial No. 03253052, European Search Report mailed Nov. 24, 2005", 2 pgs.
"European Application Serial No. 03253052.9, Notice of Decision to Grant mailed Nov. 17, 2011", 1 pg.
"European Application Serial No. 03253052.9, Office Action mailed Mar. 26, 2009", 3 pgs.
"European Application Serial No. 03253052.9, Response filed Oct. 5, 2009 to Office Action filed Mar. 26, 2009", 25 pgs.
"European Application Serial No. 03253052.9, Response filed Dec. 7, 2010 to Office Action mailed Mar. 26, 2009", 19 pgs.
"European Application Serial No. 05790836.0, Office Action Mailed Jun. 4, 2009", 3 pgs.
"European Application Serial No. 05791651.2, Office Action Response Filed Jul. 7, 2011", 11 pgs.
"European Application Serial No. 06772250.4, Office Action mailed Dec. 22, 2010", 3 pgs.
"European Application Serial No. 06772250.4, Response filed Jun. 24, 2011 to Office Action mailed Dec. 22, 2010", 18 pgs.
"European Application Serial No. 07252582.7, Extended European Search Report mailed Apr. 4, 2008", 7 pgs.
"European Application Serial No. 07252582.7, Office Action Mailed Feb. 6, 2009", 2 pgs.
"European Application Serial No. 07252582.7, Office Action mailed Dec. 27, 2011", 4 pgs.
"European Application Serial No. 07252582.7, Response filed Apr. 27, 2012 to Office Action mailed Dec. 27, 2011", 3 pgs.
"European Application Serial No. 07252582.7, Response filed Aug. 11, 2009 to Office Communication mailed Feb. 6, 2009", 2 pgs.
"European Application Serial No. 07252582.7, Response to Office Action filed Apr. 20, 2011", 4 pgs.
"European Application Serial No. 07252582.7.0, Office Action mailed Oct. 15, 2010", 4 pgs.
"European Application Serial No. 07254947.0, Extended European Search Report mailed Apr. 3, 2008", 6 pgs.
"European Application Serial No. 07254947.0, Office Action mailed Aug. 25, 2008", 1 pgs.
"European Application Serial No. 07254947.0, Office Action mailed Jan. 19, 2012", 5 pgs.
"European Application Serial No. 07254947.0, Office Action mailed Oct. 12, 2010", 4 pgs.
"European Application Serial No. 07254947.0, Response filed Apr. 26, 2011 to Official Communication mailed Oct. 12, 2010", 11 pgs.
"European Application Serial No. 07254947.0, Response filed Jul. 20, 2012 to Examination Notification Art. 94(3) mailed Jan. 19, 2012", 9 pgs.
"European Application Serial No. 07254947.0, Response filed Feb. 28, 2009 to Official Communication mailed Aug. 25, 2008", 2 pgs.
"European Application Serial No. 10252192.9, Extended European Search Report mailed Jan. 2, 2013", 8 pgs.
"European Application Serial No. 11184383.5, Extended European Search Report mailed Jul. 31, 2012", 7 pgs.
"European Application Serial No. 11184383.5, Response filed Feb. 14, 2013 to Extended European Search Report mailed Jul. 31, 2012", 23 pgs.
"Hearing Aids—Part 12: Dimensions of electrical connector systems", IEC 118-12, (1996), 24 pgs.
"Hearing Aids—Part 6: Characteristics of electrical input circuits for hearing aids", IEC 60118-6, (1999), 12 pgs.
"International Application Serial No. PCT/US2005/029793, International Preliminary Report on Patentability mailed Mar. 1, 2007", 5 pgs.
"International Application Serial No. PCT/US2005/029793, International Search Report mailed Jan. 5, 2006", 7 pgs.
"International Application Serial No. PCT/US2005/029793, Written Opinion mailed Jan. 5, 2006", 4 pgs.
"International Application Serial No. PCT/US2005/029971, International Preliminary Report on Patentability mailed Mar. 1, 2007", 6 pgs.
"International Application Serial No. PCT/US2005/029971, International Search Report mailed Jan. 5, 2006", 7 pgs.
"International Application Serial No. PCT/US2005/029971, Written Opinion mailed Jan. 5, 2006", 4 pgs.
"International Application Serial No. PCT/US2006/021870, International Preliminary Report on Patentability mailed Nov. 3, 2006", 13 pgs.
"International Application Serial No. PCT/US2006/021870, International Search Report mailed Nov. 3, 2006", 4 pgs.
"Kleer Announces Reference Design for Wireless Earphones", [Online]. Retrieved from the Internet: <URL:http://kleer.com/newsevents/press_releases/prjan2.php>, (Jan. 2, 2007), 2 pgs.
"Technical Data Sheet—Microphone Unit 6903", Published by Microtronic, (Dec. 2000), 2 pgs.
Beck, L. B., "The "T" Switch; Some Tips for Effective Use", Shhh, (Jan.-Feb. 1989), 12-15.
Birger, Kollmeier, et al., "Real-time multiband dynamic compression and noise reduction for binaural hearing aids", Journal of Rehabilitation Research and Developement, vol. 30, No. 1, (Jan. 1, 1993), 82-94.
Davis, A., et al., "Magnitude of Diotic Summation in Speech-in-Noise Tasks:Performance Region and Appropriate Baseline", British Journal of Audiology, 24, (1990), 11-16.
Gilmore, R., "Telecoils: past, present & future", Hearing Instruments, 44 (2), (1993), pp. 22, 26-27, 40.
Greefkes, J. A, et al., "Code Modulation with Digitally Controlled Companding for Speech Transmission", Philips Tech. Rev., 31(11/12), (1970), 335-353.
Griffing, Terry S, et al., "Acoustical Efficiency of Canal ITE Aids", Audecibel, (Spring 1983), 30-31.
Griffing, Terry S, et al., "Custom canal and mini in-the-ear hearing aids", Hearing Instruments, vol. 34, No. 2, (Feb. 1983), 31-32.
Griffing, Terry S, et al., "How to evaluate, sell, fit and modify canal aids", Hearing Instruments, vol. 35, No. 2, (Feb. 1984), 3 pgs.
Haartsen, J., "Bluetooth—The Universal Radio Interface for Ad Hoc, Wireless Conncetivity", Ericsson Review, No. 3, (1998), 110-117.
Halverson, H. M., "Diotic Tonal Volumes as a Function of Difference of Phase", The American Journal of Psychology, 33(4), (Oct. 1922), 526-534.
Hansaton Akustik GMBH, "48 K-AMP CONTACTMATIC", (from Service Manual), (Apr. 1996), 8 pgs.
Lacanette, Kerry, "A Basic Introduction to Filters—Active, Passive, and Switched-Capacitor", National Semiconductor Corporation, http://www.swarthmore.edu/NatSci/echeeve1/Ref/DataSheet/Inttofilters.pdf, (Apr. 1991), 1-22.
Lindemann, "Two microphone nonlinear frequency domain beamformer for hearing aid noise reduction", Applications of Signal Processing to Audio and Acoustics, IEEE ASSP Workshop on Applications of Signal Processing to Audio and Acoustics, 1995., IEEE ASSP Workshop on Oct. 15-18, 1995 On pp. 24-27 Publication Date: Oct. 15-18, 1995 On pp., (Oct. 1995), 24-27.
Lindemann, Eric, "Two Microphone Nonlinear Frequency Domain Beamformer for Hearing Aid Noise Reduction", Proc. IEEE Workshop on Applications of Signal Processing to Audio and Acoustics, (1995), 24-27.
Lybarger, S. F, "Development of a New Hearing Aid with Magnetic Microphone", Electrical Manufacturing, (Nov. 1947), 11 pages.
Mahon, William J, "Hearing Aids Get a Presidential Endorsement", The Hearing Journal,, (Oct. 1983), 7-8.
Olivier, Roy, "Distributed Signal Processing for Binaural Hearing Aid", [Online]. Retrieved from Internet: <http://infoscience.epfl.ch/record/126277/files/EPFL TH4220.pdf?version=1>, (Jan. 1, 2008), 1-143.

Olivier, Roy, et al., "Rate-Constrained Collaborative Noise Reduction for Wireless Hearing Aid", IEEE Transactions on signal Processing, IEEE Service center, New York, NY, US, vol. 57, No. 2, (Feb. 1, 2009), 645-657.
Peissig, J., et al., "Directivity of binaural noise reduction in spatial multiple noise-source arrangements for normal and impaired listeners", J Acoust Soc Am., 101(3), (Mar. 1997), 1660-70.
Preves, D. A., "A Look at the Telecoil—It's Development and Potential", SHHH Journal, (Sep./Oct. 1994), 7-10.
Preves, David A., "Field Trial Evaluations of a Switched Directional/Omnidirectional In-the-Ear Hearing Instrument", Journal of the American Academy of Audiology, 10(5), (May 1999), 273-283.
Schaefer, Conrad, "Letter referencing Micro Ear Patent", (Aug. 22, 2002), 2 pgs.
Srinivasan, S., "Low-bandwidth binaural beamforming", IEEE Electronics Letters, 44(22), (Oct. 23, 2008), 1292-1293.
Srinivasan, Sriram, et al., "Beamforming under Quantization Errors in Wireless Binaural Hearing Aids", EURASIP Journal on Audio, Speech, and Music Processing, vol. 2008, Article ID 824797, (Jan. 28, 2008), 8 pgs.
Sullivan, Roy F, "Custom canal and concha hearing instruments: A real ear comparison Part I", Hearing Instruments, vol. 40, No. 4, (Jul. 1989), 23-29.
Sullivan, Roy F, "Custom canal and concha hearing instruments: A real ear comparison Part II", Hearing Instruments, vol. 40, No. 7, (Jul. 1989), 30-36.
Teder, Harry, "Something New in CROS", Hearing Instruments, vol. 27, No. 9, Published by Harcourt Brace Jovanovich, (Sep. 1976), pp. 18-19.
Valente, Michael, et al., "Audiology: Treatment", Thieme Medical Publishers, (Mar. 1, 2000), 594-599.
Vivek, Goyal K, "Theoretical Foundations of Transform Coding", IEEE Single Processing Magazine, IEEE Service center, Piscataway, NJ, US, vol. 18, No. 5, (Sep. 1, 2001), 9-21.
Zelnick, E., "The Importance of Interaural Auditory Differences in Binaural Hearing", In: Binaural Hearing and Amplification, vol. 1, Libby, E. R., Editor, Zenetron, Inc., Chicago, IL, (1980), 81-103.
US 8,175,281, 05/2012, Edwards (withdrawn)

WIRELESS SYSTEM FOR HEARING COMMUNICATION DEVICES PROVIDING WIRELESS STEREO RECEPTION MODES

RELATED APPLICATION

This application is a continuation of and claims the benefit of priority under 35 U.S.C. §120 of U.S. patent application Ser. No. 11/619,541, filed on Jan. 3, 2007, which is incorporated by reference herein in its entirety.

FIELD OF THE INVENTION

This application relates generally to hearing communication devices, and more particularly to a wireless system for hearing communication devices providing wireless stereo reception modes.

BACKGROUND

Modern hearing communication devices that offer stereo reception typically require a wire between the left and right devices. For example, wireless stereo headsets generally include a stereo receiver and a wired connection to feed both the left and right speakers with the stereo connection. Such devices are not readily applied to other hearing communication devices, such as hearing aids. This is in part because wires are inconvenient, prone to breakage and can be less aesthetically pleasing to users who wish to conceal or downplay their use of hearing aids or other hearing communication devices.

Thus, there is a need in the art for an inconspicuous, robust, and elegant system for communicating stereo information to a wearer of hearing communication devices. The system should be convenient to use and to manufacture.

SUMMARY

This application addresses the foregoing needs in the art and other needs not discussed herein. The various embodiments described herein relate to wireless systems for hearing communication devices providing wireless stereo reception modes.

The present subject matter relates to the wireless stereo reception of first and second audio information by hearing communication devices. One type of device which may employ the present subject matter is a hearing aid. Various forms and protocols of signal transmission are employed in varying embodiments. The present subject matter includes various communication modes such as eavesdropping modes and relaying modes.

This Summary is an overview of some of the teachings of the present application and not intended to be an exclusive or exhaustive treatment of the present subject matter. Further details about the present subject matter are found in the detailed description and appended claims.

BRIEF DESCRIPTION OF THE DRAWINGS

Various embodiments are illustrated by way of example in the figures of the accompanying drawings.

DETAILED DESCRIPTION

In the following detailed description specific details are set forth to generally demonstrate various embodiments of the invention and to allow one of skill in the art to make and use the invention in its various forms. Thus, the following detailed description is not intended to provide an exclusive or exhaustive treatment of the present subject matter.

It should be noted that references to "an", "one", or "various" embodiments in this disclosure are not necessarily to the same embodiment, and such references contemplate more than one embodiment.

Figure 1:
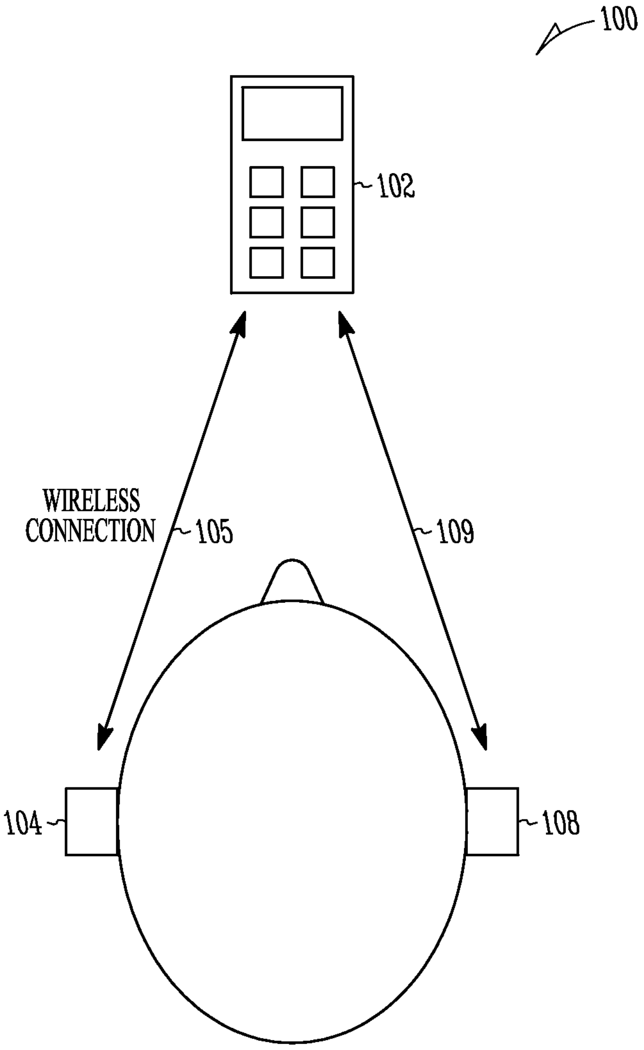
FIG. 1 shows one system using wireless devices in a direct communication mode according to one embodiment of the present subject matter.

FIG. 1 shows one system 100 using wireless devices in a direct communication mode with a remote source 102 according to one embodiment of the present subject matter. Remote source 102 transmits signals 105 to the first hearing communication device 104 including first audio information. Remote source 102 also transmits signals 109 to the second hearing communication device 108 including second audio information. In this embodiment, the first hearing communication device 104 does not have a wireless connection to the second hearing communication device 108 for transmitting stereo information from the first hearing communication device 104 to the second hearing communication device 108. Thus, the first audio information is wirelessly received by the first hearing communication device 104 and played to a first ear of the wearer and the second audio information is wirelessly received by the second hearing communication device 108 and played to the second ear of the wearer.

Figure 2:
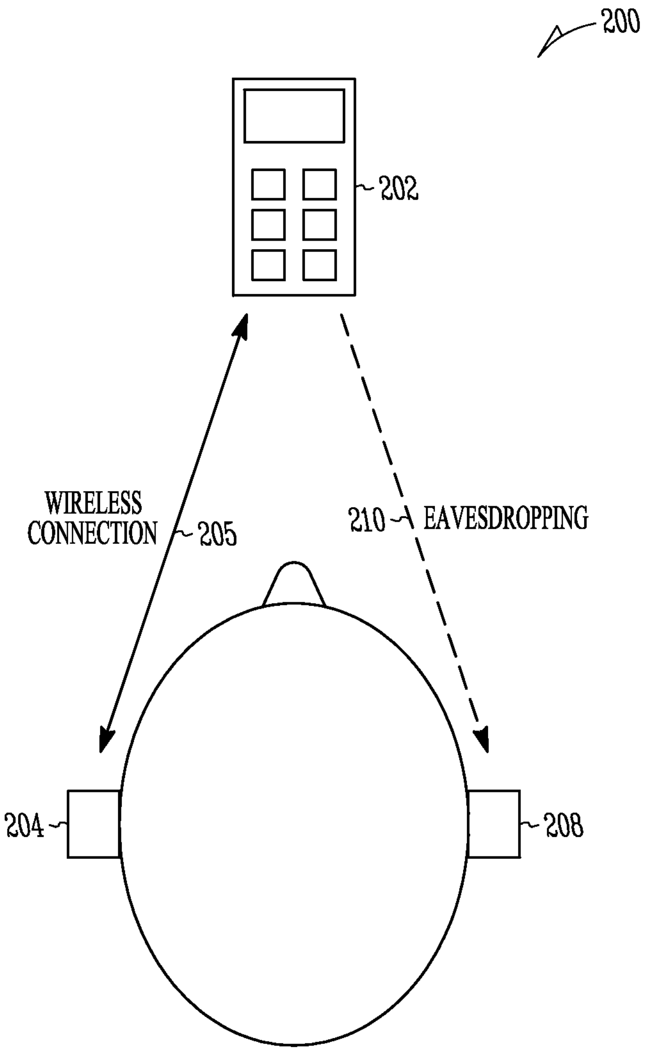
FIG. 2 shows one application using wireless devices in an eavesdropping communication mode according to one embodiment of the present subject matter.

The system in various embodiments can also support eavesdropping modes. For example, as shown in FIG. 2, in system 200 remote source 202 is in communications with first hearing communication device 204 via signals 205. Second hearing communication device 208 can "listen in" on communications from remote source 202 using a mode that is different than the mode used by the first hearing communication device 204. For instance, it is possible that second hearing communication device 208 receives signals 210, but does not control, for example, handshaking with remote source 202 to the same extent as first communication device 204. Other eavesdropping modes can be employed without departing from the scope of the present subject matter.

Figure 3:
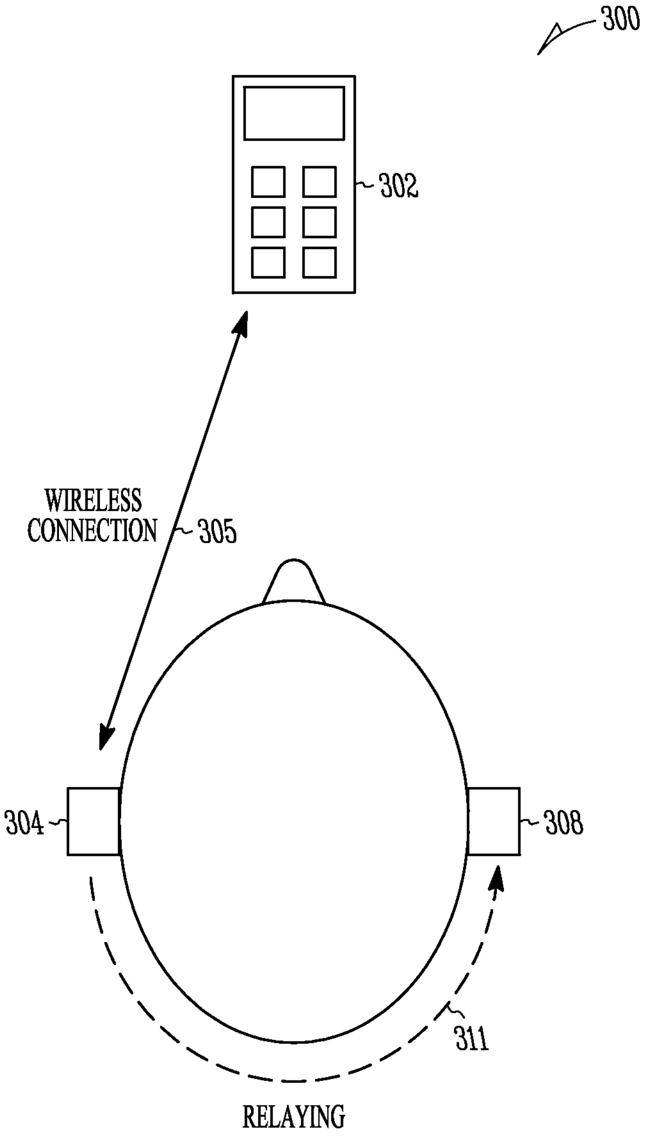
FIG. 3 shows one application using wireless devices in a relaying communication mode according to one embodiment of the present subject matter.

FIG. 3 depicts one embodiment where a relaying mode is employed to communicate wirelessly between the first hearing communication device 304 and the second hearing communication device 308. In this embodiment, first and second audio information is sent over signal 305 to the first hearing communication device 304. The second audio information is then relayed to the second hearing communication device 308 via relay signal 311. Such relay may be performed using different frequencies, different communication modes and with different data rates, for different implementations if desired. In one embodiment, the first hearing communication device 304 may demodulate and decode stereo information and encode and relay the channel bound for the instrument on or in the other ear. In various embodiments, the communications can be made using similar transmissions to the primary transmission. In various embodiments, the communications can be maded using a different method than that of the primary transmission. In various embodiments, the signals 305 and 311 are unidirectional. In various embodiments, the signals 305 and 311 are bidirectional. In various embodiments, the signals 305 and 311 are programmably combinations of unidirectional and/or bidirectional. Thus, the system 300 is highly programmable to adapt to a number of communication requirements and applications. In one embodiment, relay signal 311 is a substantially magnetically coupled or near field communication link. In one embodiment, a telecoil is employed to receive the relay signal 311. In one embodiment, a magnetic sensor is used to receive the relay signal 311. In one embodiment, relay signal 311 is a radio frequency or far field communication link. Other communication links, such as infrared and ultrasonic may be employed in various applications.

In the various embodiments and applications provided herein, different communications electronics are used by the systems (e.g., 100, 200, 300) to provide different communication modes for the stereo information. For example, in one embodiment a first channel and a second channel are employed to communicate the stereo information to the first and second ears, respectively. In one embodiment, the electronics includes frequency division multiplexed communications electronics. In one embodiment, the electronics includes time division multiplexed communications electronics. In one embodiment, the electronics includes code division multiplexed communications electronics. In one embodiment, the electronics includes packetized communications electronics. In one embodiment, the electronics includes analog communications electronics. In one embodiment, the electronics includes frequency modulated communications electronics. In one embodiment, the electronics includes single sideband communications electronics. In one embodiment, the electronics includes amplitude modulated communications electronics. In one embodiment, the electronics includes phase modulated communications electronics. Other modulation and communications embodiments are within the scope of the present subject matter and those examples provided herein are intended to demonstrate the flexibility and adaptability of the present subject matter.

The systems (e.g., 100, 200, and 300) in various embodiments can also support communications modes where the first audio information and the second audio information are the same or substantially the same audio information.

In various embodiments, the remote source (e.g., 102, 202, and 302) supports one or more communication protocols. In various embodiments, communications of far field signals are supported. Some embodiments employ 2.4 GHz communications. In various embodiments the wireless communications can include standard or nonstandard communications. Some examples of standard wireless communications include, but are not limited to, FM, AM, SSB, BLUETOOTH™, IEEE 802.11 (wireless LANs) wi-fi, 802.15 (WPANs), 802.16 (WiMAX), 802.20, and cellular protocols including, but not limited to CDMA (code division multiple access) and GSM, ZigBee, and ultra-wideband (UWB) technologies. Such protocols support radio frequency communications and some support infrared communications. Other available forms of wireless communications include ultrasonic, optical, and others. It is understood that the standards which can be used include past and present standards. It is also contemplated that future versions of these standards and new future standards may be employed without departing from the scope of the present subject matter.

Such remote sources (e.g., 102, 202, and 302) include, but are not limited to, cellular telephones, personal digital assistants, personal computers, streaming audio devices, wide area network devices, local area network devices, personal area network devices, and remote microphones. In various embodiments, the remote source includes one or more of the interface embodiments demonstrated in U.S. Provisional Patent Application Ser. No. 60/687,707, filed Jun. 5, 2005, entitled: COMMUNICATION SYSTEM FOR WIRELESS AUDIO DEVICES, and U.S. patent application Ser. No. 11/447,617, filed Jun. 5, 2006, entitled: COMMUNICATION SYSTEM FOR WIRELESS AUDIO DEVICES which claims the benefit of the provisional application the entire disclosures of which are hereby incorporated by reference. In various embodiments, one or more of the hearing communication devices use the radio technology provided in Provisional Patent Application Ser. No. 60/687,707, and U.S. patent application Ser. No. 11/447,617, both of which are incorporated by reference in their entirety. In various embodiments a low power system is provided to allow communications between the remote sources and one or more hearing communication devices.

In the embodiments demonstrated herein, the listener has first and second hearing communication devices. In various embodiments, such devices include, but are not limited to, various types of hearing aids. In one embodiment, at least one wireless hearing assistance device is a behind-the-ear hearing aid. In one embodiment, at least one wireless hearing assistance device is an in-the-ear hearing aid. In one embodiment, at least one wireless hearing assistance device is a completely-in-the-canal hearing aid. In one embodiment, at least one wireless hearing assistance device is a wireless earpiece. Various examples of wireless adapters for some hearing assistance devices using a direct-audio input (DAI) interface are demonstrated in U.S. patent application Ser. No. 11/207,591, filed Aug. 18, 2005, entitled "WIRELESS COMMUNICATIONS ADAPTER FOR A HEARING ASSISTANCE DEVICE;" and PCT Patent Application No. PCT/US2005/029971, filed Aug. 18, 2005, entitled "WIRELESS COMMUNICATIONS ADAPTER FOR A HEARING ASSISTANCE DEVICE," the entire disclosures of which are incorporated by reference.

The wireless hearing communication devices can contain a microphone to receive sounds. Some examples include a microphone for reception of ambient sound, which can be encoded and transmitted by the wireless hearing assistance device. Another example is a microphone adapted for reception of speech by the wearer of the device. The speech can be encoded and transmitted by the wireless hearing assistance device. It is understood that in certain embodiments, the wireless hearing communication devices may be wireless hearing assistance devices. One type of hearing assistance device is a hearing aid. Other wireless communication devices may be employed having various information to communicate. Thus, the devices can support bidirectional communication modes.

In various embodiments, the communications between the remote source and one or more wireless communication devices are unidirectional. In various embodiments, the communications between the remote source and one or more wireless communication devices are bidirectional. In various embodiments, the communications include at least one unidirectional communication and one bidirectional communication. Thus, the system is highly programmable to adapt to a number of communication requirements and applications. In relaying embodiments, it is understood that the communications can be unidirectional or bidirectional.

It is understood that the examples set forth herein can be applied to a variety of wireless devices and primary and secondary device combinations. Thus, the examples set forth herein are not limited to cell phone applications.

This description has set forth numerous characteristics and advantages of various embodiments and details of structure and function of various embodiments, but is intended to be illustrative and not intended in an exclusive or exhaustive sense. Changes in detail, material and management of parts, order of process and design may occur without departing from the scope of the appended claims and their legal equivalents.

What is claimed is:

1. A system for a wearer having a first ear and a second ear, comprising:

a remote source adapted to provide stereo audio wireless communications;

a first hearing communication device adapted transmit and receive wireless communications to and from the remote source, the wireless communications including first stereo channel audio information and second stereo channel audio information, wherein the first hearing communication device is adapted to provide the first stereo audio channel information to the first ear;

a second hearing communication device adapted to eavesdrop on the wireless communications between the remote source and the first hearing communication device to receive the second stereo channel audio information, the second hearing communication device adapted to provide the second stereo channel audio information to the second ear;

wherein the second hearing communication device is adapted to receive signals without an electrical connection to the first hearing communication device; and wherein the eavesdropping includes the second hearing communication device receiving signals from the remote source using a mode that is different than a mode used by the first hearing communication device.

2. The system of claim 1, wherein the remote source is adapted to conduct frequency division multiplexed communications.

3. The system of claim 1, wherein the remote source is adapted to conduct time division multiplexed communications.

4. The system of claim 1, wherein the remote source is adapted to conduct code division multiplexed communications.

5. The system of claim 1, wherein the wherein the remote source is adapted to conduct packetized communications.

6. The system of claim 1, wherein the remote source is adapted to conduct analog communications.

7. The system of claim 1, wherein the remote source is adapted to conduct frequency modulated transmissions.

8. The system of claim 1, wherein the remote source is adapted to conduct single sideband modulated transmissions.

9. The system of claim 1, wherein the remote source is adapted to conduct amplitude modulated transmissions.

10. The system of claim 1, wherein the remote source is adapted to conduct phase modulated transmissions.

11. The system of claim 1, further comprising wherein the first hearing communication device includes Bluetooth-compatible communications electronics.

12. The system of claim 1, further comprising wherein the first hearing communication device includes IEEE 802.11-compatible communications electronics.

13. The system of claim 1, further comprising wherein the first hearing communication device includes CDMA-compatible communications electronics.

14. A system for a wearer having a first ear and a second ear, comprising:

a remote source adapted to provide wireless communications;

a first hearing communication device adapted to receive wireless communications including first audio information and second audio information from the remote source, the first hearing communication device adapted to provide the first audio information to the first ear, wherein the first hearing communication device includes a near field transmitter adapted for a magnetically coupled link;

a second hearing communication device adapted to receive the second audio information from the first hearing communication device through the magnetically coupled link, the second hearing communication device adapted to provide the second audio information to the second ear; and wherein at least one of the first audio information and the second audio information includes stereo channel audio information.

15. The system of claim 14, wherein the remote source is adapted to programmably provide unidirectional or bidirectional wireless communications.

16. The system of claim 14, wherein the first hearing communication device is a behind-the-ear hearing aid.

17. The system of claim 14, wherein the first hearing communication device is an in-the-ear hearing aid.

18. The system of claim 14, wherein the first hearing communication device is a completely-in-the-canal hearing aid.

19. The system of claim 14, wherein the second hearing communication device is a behind-the-ear hearing aid.

20. The system of claim 14, wherein the second hearing communication device is an in-the-ear hearing aid.

21. The system of claim 14, wherein the second hearing communication device is a completely-in-the-canal hearing aid.

* * * * *

UNITED STATES PATENT AND TRADEMARK OFFICE

CERTIFICATE OF CORRECTION

PATENT NO. : 8,515,114 B2
APPLICATION NO. : 13/270860
DATED : August 20, 2013
INVENTOR(S) : Jeffrey Paul Solum It is certified that error appears in the above-identified patent and that said Letters Patent is hereby corrected as shown below:

On the Title Page

On page 3, in column 2, Item (56) under "Other Publications", line 50, delete "dated" and insert --mailed--, therefor On page 4, in column 1, Item (56) under "Other Publications", line 49, after "2006", insert --to--, therefor On page 4, in column 2, Item (56) under "Other Publications", line 35, delete "Mailed" and insert --mailed--, therefor On page 4, in column 2, Item (56) under "Other Publications", line 45, after "mailed", insert --Apr. 24, 2009--, therefor On page 4, in column 2, Item (56) under "Other Publications", line 54, delete "Mailed" and insert --mailed--, therefor On page 5, in column 1, Item (56) under "Other Publications", line 1, after "mailed", insert --Apr. 20, 2011--, therefor On page 5, in column 1, Item (56) under "Other Publications", line 2, delete "action" and insert --Action--, therefor On page 5, in column 1, Item (56) under "Other Publications", line 4, delete "action" and insert --Action--, therefor On page 5, in column 1, Item (56) under "Other Publications", line 19, delete "filed" and insert --mailed--, therefor Signed and Sealed this
Eleventh Day of November, 2014

Michelle K. Lee

Michelle K. Lee
*Deputy Director of the United States Patent and Trademark Office*

On page 5, in column 1, Item (56) under “Other Publications”, line 22, delete “Mailed” and insert --mailed--, therefor On page 5, in column 1, Item (56) under “Other Publications”, line 25, delete “Filed” and insert --filed--, therefor On page 5, in column 1, Item (56) under “Other Publications”, line 32, delete “Mailed” and insert --mailed--, therefor On page 5, in column 1, Item (56) under “Other Publications”, line 47, delete “1 pgs.” and insert --1 pg.--, therefor On page 5, in column 2, Item (56) under “Other Publications”, line 33, delete “A,” and insert --A.,--, therefor On page 5, in column 2, Item (56) under “Other Publications”, line 36, delete “S,” and insert --S.,--, therefor On page 5, in column 2, Item (56) under “Other Publications”, line 38, delete “S,” and insert --S.,--, therefor On page 5, in column 2, Item (56) under “Other Publications”, line 40, delete “S,” and insert --S.,--, therefor On page 5, in column 2, Item (56) under “Other Publications”, line 63, delete “F,” and insert --F.,--, therefor On page 5, in column 2, Item (56) under “Other Publications”, line 65, delete “J,” and insert --J.,--, therefor On page 5, in column 2, Item (56) under “Other Publications”, line 66, delete “Journal,,” and insert --Journal,--, therefor On page 6, in column 2, Item (56) under “Other Publications”, line 1, delete “F,” and insert --F.,--, therefor On page 6, in column 2, Item (56) under “Other Publications”, line 4, delete “F,” and insert --F.,--, therefor On page 6, in column 2, Item (56) under “Other Publications”, line 12, delete “K,” and insert --K.,--, therefor